United States Patent [19]

Anderson et al.

[11] Patent Number: 4,502,200
[45] Date of Patent: Mar. 5, 1985

[54] METHOD OF PREPARING LIGHTWEIGHT MIRROR MODULE

[75] Inventors: Alfred J. Anderson; Robert J. Thomas, both of Littleton, Colo.

[73] Assignee: Atlantic Richfield Company, Los Angeles, Calif.

[21] Appl. No.: 355,852

[22] Filed: Mar. 8, 1982

[51] Int. Cl.³ .............................................. B23P 19/00
[52] U.S. Cl. ............................... 29/526 R; 29/155 R;
126/438; 156/297; 156/581; 350/320; 350/601
[58] Field of Search .................. 29/469.5, 434, 281.1,
29/526 R, 462, 155 R, 559, 455 L, 455 M;
350/320, 292, 310; 126/424, 425, 438;
228/175–177; 156/297, 160, 163, 215, 581;
269/289 R, 266

[56]     References Cited
U.S. PATENT DOCUMENTS

| 811,274 | 1/1906 | Carter ............................ 126/424 X |
| 3,009,391 | 11/1961 | Zagieboylo et al. ................. 350/292 |
| 3,034,608 | 5/1962 | Dengler ........................ 29/155 R X |
| 3,401,390 | 9/1968 | Braccini et al. ............. 350/292 UX |
| 3,977,773 | 8/1976 | Hubbard ............................... 350/292 |
| 4,038,971 | 8/1977 | Bezborodko .................... 350/320 X |
| 4,078,549 | 3/1978 | McKeen et al. ................. 126/438 X |
| 4,239,344 | 12/1980 | Wildenrotter ................. 350/320 X |
| 4,245,895 | 1/1981 | Wildenrotter ................. 126/438 X |
| 4,249,514 | 2/1981 | Jones ............................. 126/424 X |
| 4,268,332 | 5/1981 | Winders .......................... 156/297 X |
| 4,281,900 | 8/1981 | Lewis, Jr. ....................... 350/310 X |
| 4,321,909 | 3/1982 | Trihey ............................. 126/438 X |
| 4,366,020 | 12/1982 | Overlack ........................ 156/581 X |
| 4,372,027 | 2/1983 | Hutchison ...................... 126/438 X |
| 4,373,783 | 2/1983 | Anderson ........................ 350/292 X |

FOREIGN PATENT DOCUMENTS 2738665  3/1979  Fed. Rep. of Germany ...... 350/310

Primary Examiner—Charlie T. Moon
Attorney, Agent, or Firm—Wofford, Fails & Zobal

[57]     ABSTRACT

What are disclosed are method and apparatus improvements in a heliostat for reflecting solar energy onto a collector, the heliostat having a main support structure with pivoting and tilting motors and controls and mirror modules for reflecting the solar energy. The improvement is characterized by one of a combination, or curved, or lightweight mirror module in which the curved mirror focuses the energy more precisely, attenuates differential expansion due to temperature change, yet is simple and economical to build and is light enough in weight to enable building larger modules for the heliostats, as well as building larger heliostats. The specific improvement is characterized by a curved mirror formed over a plurality of templates with longitudinal support beams holding it into the predetermined curvature with transversely extending structural beams and attachment bolt for attaching it to the heliostat. Also disclosed are specific preferred methods steps and structural components.

4 Claims, 13 Drawing Figures

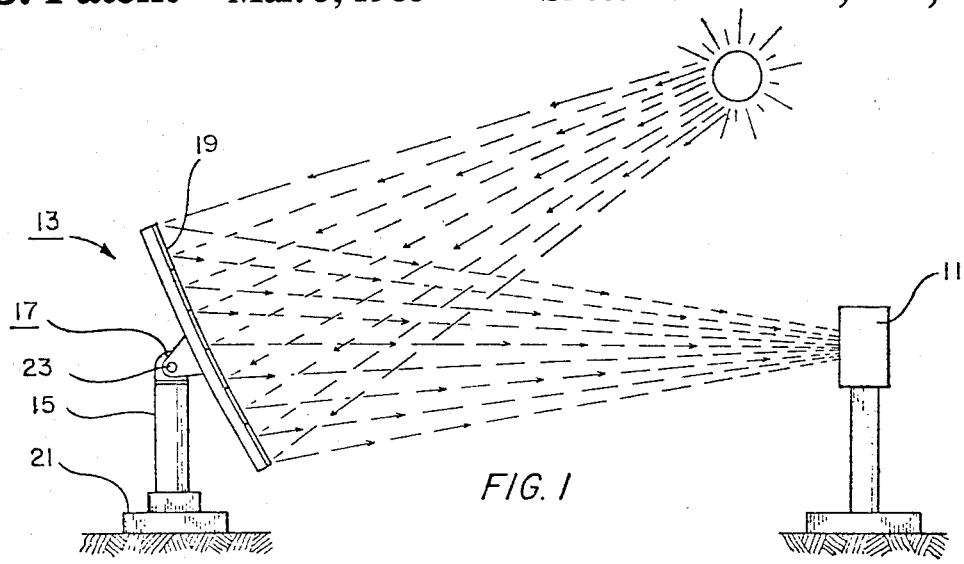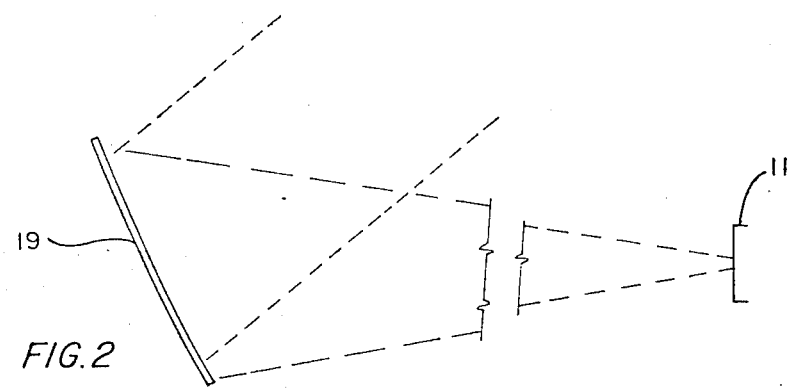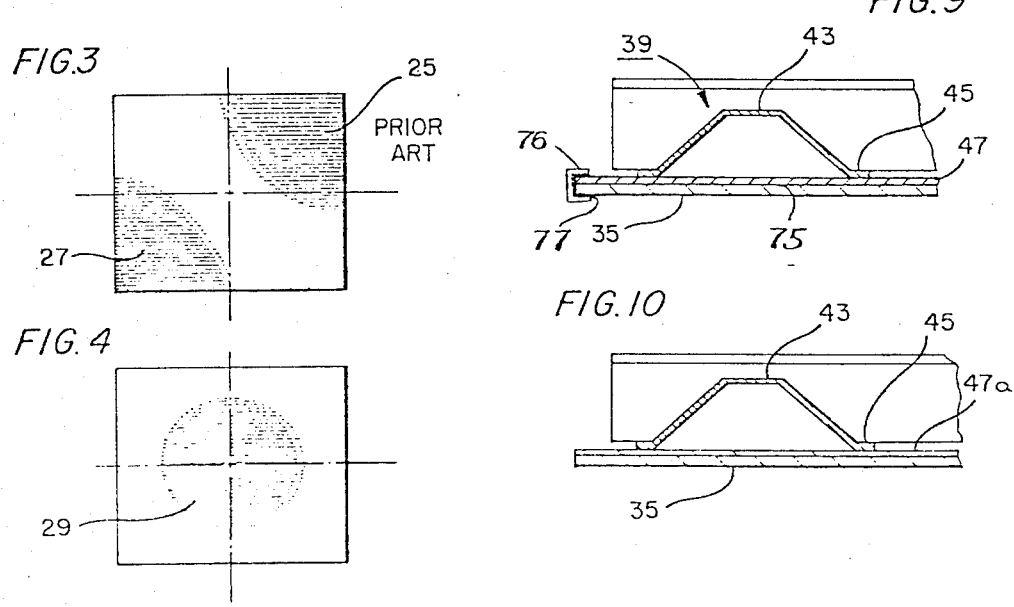

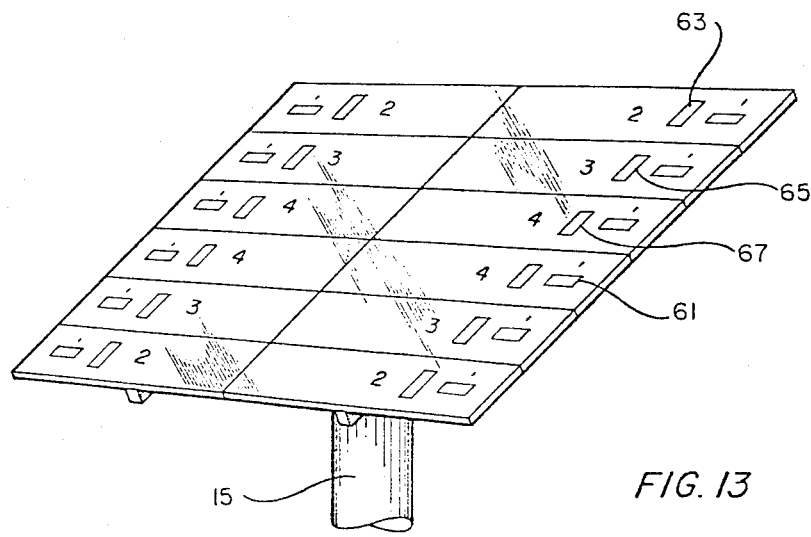
FIG. 13
FIG. 5
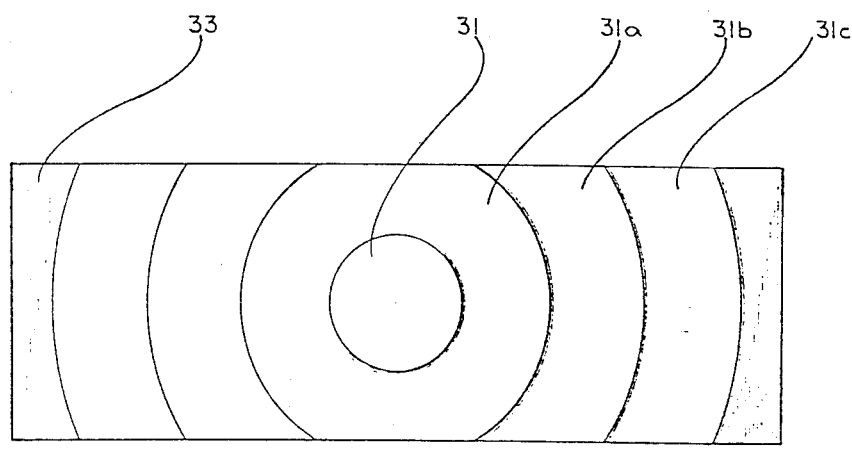

METHOD OF PREPARING LIGHTWEIGHT MIRROR MODULE

FIELD OF THE INVENTION

This invention relates to heliostates. More particularly, it relates to improved mirror modules for the heliostats for reflecting the solar energy onto a remote collector.

DESCRIPTION OF THE PRIOR ART

With the increased cost and scarcity of fossil fuels and other energy sources, much work is being done to try to use solar energy. In employing solar energy, a plurality of heliostats reflect the solar energy onto a remote collector.

Typical of such systems are those described in U.S. Patents. For example, U.S. Pat. No. 3,905,352 lists some fourteen earlier patents ranging from U.S. Pat. Nos. 260,657 through 3,469,837; and describes a system for collecting and transferring usable solar heat by reflecting the sun from heliostats on an elevated platform into a central receiving station.

U.S. Pat. No. 3,892,433, inventor Floyd A. Blake, describes a direct solar hydroelectric integrated system and concentrating heliostats for such a solar system. U.S. Pat. No. 3,924,604 describes a solar energy conversion system in which pivotally mounted pads reflect energy onto a elevated tower collector.

Initiallly the heliostats were large structural elements with high cost per unit area. As larger total area of reflecting surface became needed, much research was put into trying to reduce the cost per unit area. This resulted in using material such as plastic foam adhered onto a steel backing with a mirror front. While this did reduce cost significantly, it introduced a thermal error in which, because of uncontrolled differential expansion or contraction of the materials as the temperature changed, a bowing of the mirror module resulted. This made difficult keeping the mirror module focused onto the collector so as to most efficiently use the sun's energy by the collector.

All of the prior art attempts to solve this problem have resulted in intolerably increasing the cost of the mirror modules above about $2.40 per square foot. In a co-pending application by Alfred Jerome Anderson, entitled "Structural Heliostat", Ser. No. 06/138,207, filed Apr. 7, 1980, there was disclosed an improved heliostat that provided one way of curing the thermal instability through the use of front and back portions on the mirror module of the same materials so the expansion was the same. This improved version had the ability to withstand weather such as beating from hail, rain, wind and the like and enabled canting the mirror modules and provided an improved module from the standpoint of economy. This improved module still had a relatively heavy weight per mirror module, however and did not provide the following groups of features deemed desirable.

For example, it is desirable that the mirror modules have the following first group of features:

1. The mirror module should be lightweight, for example, about half the weight of the prior art modules.
2. The mirror module should resist thermal distortion because of differential expansion or contraction.
3. The mirror module should be simple and economically constructed from economical, readily available materials.
4. The mirror module should enable building larger modules and larger heliostats for a given main structural support and drive system.

In addition to this first group of features, it would be advantageous if the mirror modules were curved for focusing of the solar energy onto a target to simultaneously minimize the scattering of the solar rays because of differential expansion and contraction as the temperature changed.

It is particularly advantageous to provide the combination of a curved mirror and lightweight mirror module, simultaneously alleviating the problem of differential expansion, and providing simple and economical construction of readily available materials, and enabling building and using larger modules and hence larger heliostats.

Thus it can be seen the prior art has not been totally successful in solving the problem delineated hereinbefore and also providing the features delineated hereinbefore.

SUMMARY OF THE INVENTION

Accordingly, it is an object of this invention to provide a method of making a lightweight mirror module that achieves a plurality of the features not heretofore provided while simultaneously solving the problems of the prior art in providing all of the advantages of the prior art.

It is a specific object of this invention to provide an improvement in a method that provides a lightweight mirror module that has about half the weight of the prior art modules, that solves the problem with differential thermal expansion and contraction and provides all of the advantages provided by the prior art while alleviating the problems of the prior art.

These and other objects will become apparent from the descriptive matter hereinafter, particularly when taken in conjunction with the appended drawings.

In accordance with this invention there is provided an improved, lightweight mirror module for a heliostat for reflecting solar energy onto a collector and including a main support structure; means for pivoting and tilting the heliostat so as to keep the solar energy focused onto the collector; and a plurality of mirror modules for reflecting the solar energy onto the collector, the improvement comprising having the lightweight mirror module that is economically constructed from readily available, economical materials and consisting essentially of: a mirror support structure connected with the back of the mirror and consisting essentially of:
  i. a plurality of longitudinally extending beams having sufficient connection surface and strength for supporting the mirror cantilevered from the main support structure of the heliostat; and
  ii. a plurality of transversely extending beams connected to the longitudinally extending beams carrying a mirror;

and attachment means connecting the mirror support structure to the main support structure.

In accordance with another embodiment of this invention there is provided a method of preparing a lightweight mirror module for a heliostat comprising the steps of laying a mirror face down on a stable support bed, a. connecting a plurality of longitudinally extending beams with the backside of the mirror such that a strip of support is provided at least ½ inch wise at least each 6 inches; and connecting a plurality of transversely extending beams to the plurality of respective longitudinally extending beams; and b. connecting the respective attachment means to the transversely extending beams for connection with the main support structure.

BRIEF DESCRIPTION OF THE DRAWINGS

FIG. 1 is a side elevational view, partly schematic, showing one embodiment of this invention.

FIG. 2 is a schematic side elevational view emphasizing the curvature of the respective mirrors of the mirror module of FIG. 1.

FIG. 3 shows a typical prior art reflection of solar energy onto a target.

FIG. 4 represents a reflection of the solar energy onto the target in accordance with the embodiment of FIG. 2.

FIG. 5 is a plan view of a plurality of templates emplaced on a supporting bed in accordance with one embodiment of this invention.

FIG. 9 is a partial cross sectional view showing one of the longitudinally extending beams connected to a metallic sheet on the backside of the mirror.

FIG. 10 is a partial cross sectional view of another embodiment of the invention in which the longitudinally extending beam is connected with a glass substrate on the back side of the mirror.

FIG. 13 is a schematic view of a heliostat showing the canting sequence.

DESCRIPTION OF PREFERRED EMBODIMENTS

Figure 6:
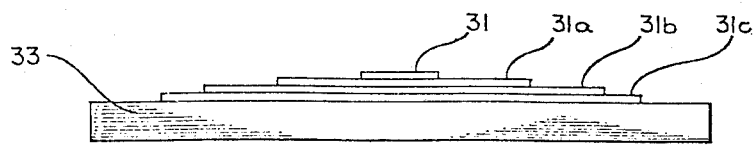
FIG. 6 is a side elevational view of the templates of FIG. 5 emplaced on a support bed.

As indicated hereinbefore, the usual system for employing solar energy includes a collector 11, FIGS. 1 and 2 for receiving and using the radiant energy from the sun. The solar system also includes a plurality of reflectors, or heliostats, for reflecting the radiant energy of the sun onto the collector 11. Ordinarily, in the prior art, the collector was supported on a tower to facilitate receiving the radiant energy from a plurality of heliostats spaced about the collector. For example, where a plurality of three or more rows of the respective heliostats were employed, the tower was at least 100 feet high, or higher. Usually it was 200 feet high.

In the prior art, the collector included a steam generator that produced steam by heating water for use in a Rankine cycle engine; or included an array of photovoltaic cells to produce electricity directly. Other type collectors can be employed and it is immaterial to this invention as to the nature of the collector. For example, where water was converted to steam, the steam was passed through turbines rotating generators generating electricity. If desired, the collector may absorb the radiant energy to convert it to heat for heating oil or other high boiling liquid that will be passed in heat exchange relationship with the water or the like.

The nature of the towers is immaterial to this invention.

If desired, respective sensors for each heliostat can be employed to direct reflected beams onto the target to insure that the sunlight is reflected onto the collector by the heliostat. On the other hand, other systems such as computer controlled heliostats are known. These types of heliostat controls are well known and need not be described herein. It is sufficient to note that the heliostat is pivoted and tilted to maintain the solar rays reflected onto the target collector.

As noted hereinbefore, the heliostat and remainder of the solar system were frequently located in terrain experiencing wide diurnal and seasonal temperature variations. These temperature variations induced uncontrolled differential thermal contraction or expansion between the mirror and supporting substrate between the lowest temperature and the highest temperature and resulted in thermal stesses and curvature effects which degraded the reflected solar energy image at the target. The type and degree of degradation was a complex function of the temperatures at assembly and maximum and minimum temperatures in situ.

Referring to FIGS. 1 and 2, there is illustrated a heliostat 13 in accordance with an embodiment of this invention. The heliostat includes a main support structure 15 and means 17 for pivoting and tilting the heliostat containing a plurality of mirror modules 19.

The main support structure 13 includes a vertical support such as a post embedded in a foundation 21, like concrete. The post is ordinarily of steel pipe or the like. As will be apparent, any support structure adequate to withstand the loads imposed will be satisfactory.

The means 17 comprises the usual combination of motors, gears and pinions for rotating the heliostat with respect to the vertical axis of the post 19 and for rotating the horizontally extending arms 23 and, hence, tilting the heliostat, including the mirror modules 19. The heliostat may be fastened in a vertical or horizontal position for being stored overnight, during windstorms and the like. Suitable fastening means such as latches and the like can be employed to take the strain off the means 17 for pivoting and tilting the heliostat. The means 17 pivots and tilts the heliostat to keep the solar energy focused on the collector. This focusing may be done, as indicated, by either sensors or by computer controls. The system employed is relatively immaterial to this invention. As indicated hereinbefore, this invention is concerned with a combination mirror module that is thermally stabilized against curvature induced by temperature change, has lightweight and that has a curved mirror, as well as the other features delineated hereinbefore. For example, as can be seen in FIG. 3, the prior art type reflection resulted in diffuse patterns 25, 27. These diffuse patterns, or images, resulted from differential temperature expansion of the mirror modules resulting in curvature and separated the respective images. In contrast, as can be seen in FIG. 4, the image 29 is coherent and concentrated when reflected in accordance with the mirror module of this invention.

Figure 7:
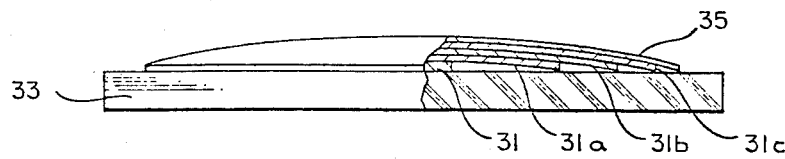
FIG. 7 shows the templates inverted in accordance with a further step after FIG. 6.
Figure 8:
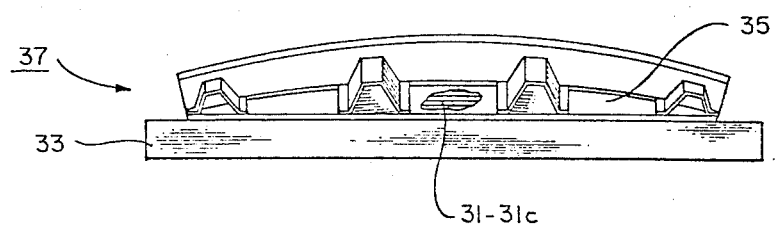
FIG. 8 shows a still further step from the embodiment of FIG. 7 in which a mirror and lightweight mirror support structure have been connected.

The method of embodiment of this invention may be understood by referring to FIGS. 5–8. Specifically, the method of preparing a mirror module for a heliostat or the like comprises a plurality of steps as follows. First a plurality of templates 31, 31a, 31b, and 31c, for example, are prepared. The templets 31–31c are sized and placed so as to support a mirror in the predetermined curvature along a plurality of predetermined lines. As can be seen in FIG. 7, the templates are preferably inverted and placed on a support bed 33. The predetermined curvature to be induced into the mirror is that of a sphere having a radius equal to twice the distance from the mirror module to the collector. For all practical purposes, the radius of curvature of the sphere will be twice the distance from the main support structure of the heliostat in its array around the collector, to the collector. Initially the templates 31–31c were formed of cellulosic material such as fiberboard and the like. It was found, however, that there was a problem of degree of moisture adsorption such that the relative thickness, hardness and the like would change. Consequently, the templates were formed of plastic such as sheets of polyethylene and the like.

The templates were emplaced on a firm support bed 33, as implied hereinbefore. In fact, preferably, the templates were inverted as illustrated in FIG. 7, similarly as implied hereinbefore, before the mirror was placed face down on the templates. Thereafter, the mirror was laid face down on the templates such that the mirror had the predetermined curvature for reflecting solar rays closely toward a target spot on the collector when installed on the heliostat. The installation of the mirror 35 can be seen in FIG. 8.

Subsequently, a mirror support structure 37 is connected with the back side of the mirror so as to maintain the predetermined curvature when the mirror is moved into position for being attached to the heliostat 13. Any mirror support structure that will maintain the predetermined curvature and that will obviate the problems of curving because of differential expansion or contraction may be employed herein. In a preferred embodiment, the support structure comprises a plurality of longitudinally extending beams 39, FIG. 11, connected with the mirror, and a plurality of transversely extending beams 41 connected with the longitudinally extending beams carrying the curved mirror. While the longitudinally extending beams and the transversely extending beams may be formed of any material that will bear the weight of the mirror cantilevered from the main support structure of the heliostat, it is preferred that they be metallic in order to be easily worked, treated to resist corrosive effects of the weather, and be readily connectable with the backside of the mirror 35. In a particularly preferred embodiment the longitudinally extending beams 39 comprise beams of the so-called hat shape cross section shape. As illustrated in FIGS. 9 and 10, the beams have a crown portion 43 with a small horizontally extending brim portion 45. The brim portions 45 are affixed, as by adhering, either to the backside of the mirror 35 directly, or may employ a metallic backing sheet 47 as illustrated in FIG. 9.

When a metallic backing sheet 47 is employed, a layer of grease such as a silicone grease 75 may be employed between the mirror 35 and the backing sheet 47. The silicone grease serves to protect the mirror back surface from moisture or other environmental damage; it serves as an adhesive; and it permits differential thermal expansion to occur between the glass mirror and metallic backing sheet which prevents thermal stresses or thermal curvatures from occurring. A metallic edge molding 76 which is applied with a soft adhesive 77 such as butyl rubber, silicone rubber, or polysulfide elastomer serves to seal the edge from rain and other environmental effect, and to securely affix the mirror glass and metallic backing sheet together. The soft edge adhesive 77 provides a good mechanical bond yet still permits any differential expansion or contraction to freely occur. The resultant configuration illustrated in FIG. 9 is, therefore, a very thermally stable configuration and temperature changes will not induce any curvatures or distortions which would degrade the reflected beam quality.

When a metallic backing sheet is not employed, as is illustrated in FIG. 10, the brim portions 45 may be affixed directly to the back of the mirror 35. However, such a configuration would provide poor protection of the backside mirror surface from environmental damage. To overcome this potential problem special, highly reflective mirrors having glass substrates 47a, FIG. 10 can be employed. With these types mirrors, the front glass is very thin with a resultant increased reflectivity for reflecting more of the solar energy that is incident thereon onto the collector. The glass substrate 47a is adhered to the mirror by any one of the conventionally employed laminating methods and such mirrors with affixed glass back sheets are commercially obtainable. While such laminated mirrors are more expensive than ordinary mirrors, the added cost is usually more than compensated by the increased reflectivity which results in more energy being delivered to the collector. The laminated glass is also stronger and more durable. Since the glass substrate serves to seal-in the mirror silvering layer, no additional protection such as the use of silicone grease and a metallic substrate is required. The brim portion 45 of the longitudinally extending beams 39 are directly bonded to the laminated mirror. Any of the suitable bonding materials can be employed. One of the preferred types of bonding materials is a room-temperature-vulcanizing silicone rubber such as RTV-548-556A base and RTV-548-557B curing agent manufactured by General Electric Company, Silicone Products Department, Waterford, N.Y. Another suitable type is the polyacrylic adhesive and catalyst such as Versilok 204, available from Hughson Chemicals, Erie, Pa. Other suitable adhesives are well known in this art and need not be detailed at length herein. These include the polymethacrylic polymers and catalysts; the resins such as the epoxy resins, urethane resins, cyanoacrylate resins, methylacrylate resins, vinyl ester resins and the acrylate resins. Suitable catalysts, also referred to as accelerators or initiators, include the N,N-dimethyl-p-toluidine, N,N-dimethyl aniline, or, for the epoxy resins, cobalt naphthenate; and methyl ethyl ketone peroxide. As is recognized these type polymers set up and adhere when they are subjected to the accelerator or catalyst and are readily available from several sources, as described in the aforementioned patent application Ser. No. 138,207. Details of that application are incorporated herein by reference for details that are omitted herefrom. While the configuration of FIG. 10 employing longitudinally extending beams adhesively bonded directly to a mirror, either plain or laminated, results in a very low cost, low weight reflective unit, this configuration does have the disadvantage that temperature changes will cause curvature changes. However, in many large-scale applications the collector 11 is of likewise a large size and the curvature change with temperature can be tolerated. One of the advantages of this invention is that the curved mirror, in and of itself, tends to alleviate problems with the differential temperature expansion and contraction; i.e., the undesirable convex curvature which causes beam divergence can be avoided by judiciously pre-curving the mirror with sufficient concavity.

Hence, the concepts embodied herein are: a lightweight, low cost configuration illustrated by FIG. 9 which offers the added advantage of being thermally stable such that no curvature change occurs with temperature; and an alternative configuration illustrated by FIG. 10 which is even lighter in weight, and lower in cost but has the disadvantage of curvature changes with temperature changes.

In any event, the longitudinally extending beams 39 are connected with the transversely extending beams 41 by any of the conventional means. Such conventional means include thermal bonding such as welding, brazing, silver soldering; adhering, as by the adhesives delineated hereinbefore, or bradding or riveting through flanged portions or the like. As illustrated, the transversely extending beams 41 are cut out to match the longitudinally extending beams and have flanges that increase the surface bonding between the two sets of beams. If desired, of course, the transversely extending and longitudinally extending beams may be bradded together, welded together, or the like.

Figure 12:
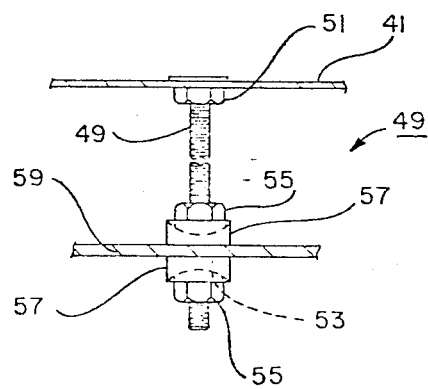
FIG. 12 is a partial side elevational view showing an attachment means for attaching to the transversely extending beams of FIG. 11.

One of the advantages of this lightweight structure serving as the mirror support structure is that the longitudinally extending beams, and even the transversely extending beams, can be suitable cambered (curved) during a roll forming operation or fabricated straight and then notched along their length to be affixed to the backside of the mirror so that the mirror maintains the induced curvature even when connected with a heliostat main structural support by the attachment means 49, FIG. 12.

In the attachment means of FIG. 12, the bolt 49 has its head end 51 affixed, as by welding, brazing or the like, to the transversely extending beam 41 and extends to penetrate through an aperture 53 that is larger than the diameter of the bolt 49. This allows for differences in expansion and contraction of the main structural support and of the mirror module 17. To accommodate this, a pair of spherical nuts 55 and spherical washers 57 are employed to allow a slight pivotal movement to the bolt 49 through the aperture 53. If desired, of course, the base may be pressed into the mirror module and a jam nut screwed downwardly on an entirely threaded bolt. Then the spherical nut and spherical washers that are illustrated allow accommodating pivotal motion on the main truss 59. As is recognized the main truss 59 is a conventionally employed truss hanging as a part of the main structural support of the heliostat.

Figure 11:
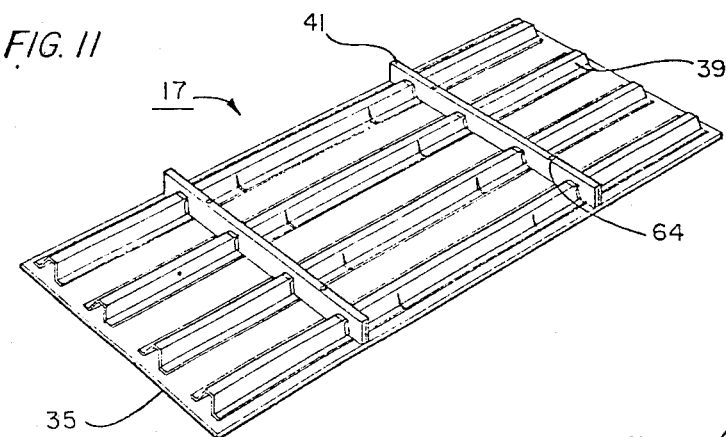
FIG. 11 is an isometric view of the backside of a mirror module of this invention without the attachment means.

In operation, the mirror module is formed as delineated hereinbefore. Once the attachment means are connected to the transversely extending beams 41, the mirror modules are ready to be affixed to the remainder of the main structure 15 of the heliostat, FIG. 13. As illustrated in FIG. 13, the mirror modules are canted on a horizontally positioned set of trusses to facilitate assembly, rather than being put in a vertical position and focused onto the collector. In terms of focusing, the outside edges of the respective mirror modules are attached slightly closer to the collector in order to focus the rays toward the collector. For example, if the delineated heliostat structure 15, FIG. 13, is the number one heliostat, a Starret level equivalent to the number one row will be employed to effect focusing of the mirrors with respect to the horizontal component of the focusing, or horizontal plane. As can be seen therein all of these Starret levels 61 for the horizontal focusing are labeled by the numeral 1 to show that it is the first row at a predetermined radial distance from the collector that has this focus. Expressed otherwise, the mount at which the outside edge is raised is approximately the tangent, or sine, of the angle of inclination, or focusing, with respect to the normal axis of the heliostat multiplied by the distance from the center line of the heliostat to the particular attachment point. As can be seen in FIG. 11, it is preferred to form four of the attachment points 64 with this invention to increase structural torsional rigidity of the mirror modules. In the prior art it has been conventional to employ only three attachment means. As will be understood, a heliostat is ordinarily about 24 feet square. Accordingly, it is frequently advantageous to focus the mirror modules from top to bottom, also. Accordingly, the Starret levels 63 will be for effecting the focusing of the top and bottom mirror modules, labeled 2 in FIG. 13. By similar reasoning, the penultimate mirror modules toward, respectively, the top and bottom will be canted using Starret levels 65, labeled 3. By similar reasoning, the four centermost mirror modules in the illustrated heliostat of FIG. 13 use Starret levels 67 designated by the numeral 4. In accordance with conventional practice, therefore, the respective canting of the mirror modules is effected with the respective Starret levels such that all of the mirror modules in a given row of heliostats the same radial distance from the collector have the same focusing with respect to the horizontal axis when the heliostat is in a vertical position. Similarly, the respective mirror modules have focusing with respect to the top and bottom rows of mirror modules, now two each, have the same canting. Similarly the next to the top and next to the bottom rows have the same canting with respect to the vertical axis when the heliostat is in a vertical position; and the four centermost mirror modules have the same canting with respect to the vertical axis. As will become apparent, the four centermost modules are canted less than, for example, the four top and bottom mirror modules in order to obtain focusing on the collector at a predetermined radial distance. This focusing coupled with the curved mirror effects the excellent results delineated in FIG. 4 in accordance with this invention. As implicit from the foregoing, the respective spherical nuts and washers can be moved inwardly along the bolt to effect the desired focusing with the Starret levels.

As soon as the mirror modules are connected with the structure of the heliostat, the respective heliostats are integrated into the central control system to start reflecting the sun onto the collector when desired. For example, the heliostats may be stored at night and by computer or the like brought to reflect the sunlight onto the collector in the morning as soon as the sun rises. As will be appreciated, if there is some error in reflection, the canting can be adjusted by simply screwing the spherical nuts along the bolt of the attachment means.

The following example illustrates the preferred embodiments of this invention.

EXAMPLE

In this invention, a conventional mirror was adhered to a metallic substrate 47 by silicone grease. As is recognized and as described in the aforementioned Ser. No. 138,207, the silicone greases are employed to have water repellancy and have adequate strength to support the mirror, yet have sufficient shear tolerance to permit differential expansion of the mirror and substrate when the temperature changes without inducing stresses or curvature effects. The silicone grease also is adapted to hold the mirror securely and prevent fluttering of the mirror with respect to the substrate. Of course, conventionally available mirrors with attached substrates can be employed. The templates 31-31c were cut and laid on the bed 33. The mirror was laid face down over them and the mirror support structure 37 attached as noted hereinbefore; namely through adhesion of the transversely and longitudinally extending beams to, respectively, the beams and the back of the mirror. The attachment means were affixed to the transversely extending beams 41 and were attached to the main heliostat structure 15 as delineated. Thereafter, the heliostat was connected into the main control system and a plurality of these heliostats were directed on the target. Displays such as illustrated in FIG. 4 with coherent images were obtained. In this embodiment, the longitudinally extending beams comprised galvannealed steel hat beams have brims of one-half inch length with six inch crown portions in between. The longitudinally extending members were placed so that there was only six inches between the edges of the beams. This guaranteed that at least each six inches there was a support seam at least one-half inch wide. This was found to be adequate to give the necessary properties to mirrors which were 0.093 inches thick when 0.020 inch thick steel longitudinal beams were employed. Similarly, the transversely extending beams were formed of 0.020 inch thick galvanized steel that had flanges cut out to receive the hat beams and had a U-shaped top portion that received the attachment means. With this structure the long hat beams weighed only 40 pounds (10 pounds for each beam) and the cross members weighed only three pounds for two cross beams. The mirrors weighed 56 pounds so a total of 99 pounds was all that a 4.0 foot wide by 12.0 foot long mirror module weighed. This corresponds to a unit weight of only 2.06 lb/ft2 which is approximately one-half the unit weight of conventional mirror modules.

With this same lightweight structure, highly reflective mirrors formed with only 0.025 inch front mirror with 0.068 glass back sheet were employed. The glass encased the silvering on the mirror. High reflectivity was obtained with this mirror.

Both sets of mirrors were tested for the equivalent of high wind loads. In horizontal position they were required to withstand 12 pounds per square foot. They were tested and broke at 38 pounds per square foot. In the vertical position, they are required to withstand 37 pounds per square foot. Again they were tested and broke at 38 pounds per square foot. To test against hail impact, the mirrors were pelted by one inch diameter hailstones having a velocity in the range of 75-100 feet per second. The mirrors were not damaged. It appears by having the structural support at least each six inches, the mirrors resisted the 75 feet per second velocity of one inch ice balls required for the heliostats. In addition, the pre-curved mirror modules attenuated the problem of differential expansion and obtained satisfactory focusing at a range from 32° F. to 120° F.

This example indicated that there was a slight loss in torsional stiffness requiring four tie down points instead of the three tie down points. Conventional Starret leveling could be employed.

This invention indicated that the mirror modules could be made in lengths of up to 24 feet instead of the conventional lengths of 12 feet. Moreover, because of the lightweight the sizes of the heliostats can be increased and still be driven by the conventional drive units now employed.

From the foregoing, it can be seen that this invention accomplishes the objects delineated hereinbefore. Specifically, this invention has all of the features delineated hereinbefore as desirable and not heretofore provided.

What is claimed is:

1. A method of preparing a mirror module for a heliostat or the like for reflecting solar energy onto a collector, which includes laying a mirror face down on a firm supporting bed and attaching a supporting structure to the backside of the mirror, the improvement comprising the steps of:
   a. adhesively connecting a plurality of longitudinally extending beams to the backside of the mirror so as to provide a region of support longitudinally of said mirror at least each six inches of transverse distance of said mirror; said longitudinally extending beams being connected and having sufficient strength to support said mirror cantilevered from a heliostat main support structure; said longitudinally extending beams having a cross-sectional shape of the so-called hat type and having brim areas of said beams adhered to the back side of said mirror so as to provide said longitudinal region of support on each edge of said longitudinally extending beam; and having a dimension such that there is no more than six inches space between any region of support longitudinally of said mirror in order that said mirror have the requisite hail resistance;
   b. connecting a plurality of transversely extending beams to said longitudinally extending beams carrying said mirror; said plurality of transversely extending beams being adapted to share substantially evenly the weight of said mirror and said longitudinally extending beams and minimize torsional effects in said mirror module; and
   c. affixing to said transversely extending beams a plurality of attachment means for attaching to the heliostat structure; said attachment means being adapted to minimize flexure and hold a predetermined shape of said mirror module.

2. The method of claim 1 wherein said attachment means are adapted to accomodate slight pivotal connection at the point of connection at one of their ends and to provide Starrett leveling and each includes an all-thread bolt that is affixed at one end and has two nuts with two spherical washers intermediate the two nuts to accomplish the Starrett type leveling for focusing of the solar energy reflected by said mirror.

3. The method of claim 1 wherein said mirror backside has a glass substrate for protection of the mirroring and said beams connect directly to said glass substrate on the backside of said mirror.

4. The method of claim 3 wherein said supporting structure is adhered to said substrate.

* * * * *